(12) United States Patent
Hutchison et al.

(10) Patent No.: US 8,117,592 B2
(45) Date of Patent: *Feb. 14, 2012

(54) CODE ASSIST FOR MULTIPLE STATEMENT PATTERNS

(75) Inventors: Gordon Douglas Hutchison, Hampshire (GB); David Screen, Hampshire (GB); Joseph Robert Winchester, Hants (GB)

(73) Assignee: International Business Machines Corporation, Armonk, NY (US)

( * ) Notice: Subject to any disclaimer, the term of this patent is extended or adjusted under 35 U.S.C. 154(b) by 882 days.

This patent is subject to a terminal disclaimer.

(21) Appl. No.: 12/173,109

(22) Filed: Jul. 15, 2008

(65) Prior Publication Data

US 2010/0017786 A1 Jan. 21, 2010

(51) Int. Cl.
G06F 9/44 (2006.01)

(52) U.S. Cl. ......................................... 717/111

(58) Field of Classification Search .................... 717/111
See application file for complete search history.

(56) References Cited

U.S. PATENT DOCUMENTS

| 6,305,008 B1 | 10/2001 | Vaidyanathan et al. |
| 6,367,068 B1 | 4/2002 | Vaidyanathan et al. |
| 7,373,634 B2 * | 5/2008 | Hawley et al. ............... 717/110 |
| 7,562,343 B2 * | 7/2009 | Hawley et al. ............... 717/113 |
| 7,685,570 B2 * | 3/2010 | Draine et al. ................ 717/125 |
| 2004/0153995 A1 * | 8/2004 | Polonovski .................. 717/113 |
| 2004/0205708 A1 * | 10/2004 | Kothari et al. ............... 717/113 |
| 2004/0237067 A1 * | 11/2004 | Sun et al. .................... 717/110 |
| 2005/0015746 A1 * | 1/2005 | Shukla et al. ................ 717/109 |
| 2008/0115109 A1 * | 5/2008 | Bostick et al. ............... 717/125 |

* cited by examiner

*Primary Examiner* — Anna Deng
*Assistant Examiner* — Junchun Wu
(74) *Attorney, Agent, or Firm* — Schmeiser, Olsen & Watts; Dermott Cooke

(57) ABSTRACT

A process and system for assisting a user to write new lines of code of a computer program based on code examples. A first line in each code sample matching a specified anchor line. A loop having a custom line branch and a code assist branch is executed. The custom line branch generates a new line for the computer program via a custom line provided by the user. The code assist branch generates a new line for the computer program via code assist. The code assist determines a set of assist lines from the code samples, selects from the assist lines set of preferred lines sequenced in an order of preference, presents the set of preferred lines to the user, receives a preferred line selected by the user after the user edits the selected line to fit the user's context, and stores the preferred line as a new line.

24 Claims, 2 Drawing Sheets

CODE ASSIST FOR MULTIPLE STATEMENT PATTERNS

FIELD OF THE INVENTION

The present invention provides a process and system for assisting a user to write new lines of code of a computer program based on code examples.

BACKGROUND OF THE INVENTION

A code assist is software that assists a user writing a computer program to complete a partially complete (or incorrect) line of code that the user has typed, by suggesting a suitable set of completions for the typed line of code.

Current code assist software presents only limited assistance and the user is still required to use considerable manual effort to write the complete program in its entirety.

Accordingly, there is need for an improved code assist that enables the user to write the computer program with less manual effort than is required with current code assist software.

SUMMARY OF THE INVENTION

The present invention provides a process for assisting a user to write an ordered sequence of new lines of code ($L_0, L_1, L_2, \ldots$) of a computer program, said process using a plurality of code examples such that each code example comprises an ordered sequence of lines of code ($X_0, X_1, X_2, \ldots$), said process implemented by execution of instructions by a processor of a computer system, said instructions being stored on computer readable storage media of the computer system, said process utilizing an index R that points to line $L_R$ (R=0, 1, 2, ...) and initially points to the first line $L_0$ of the new lines of code, said process utilizing an index K that points to line $X_K$ (K=0, 1, 2, ...) and initially points to the first line $X_0$ of the ordered sequence of lines of code, said process comprising:

receiving and storing line $L_0$, wherein is an anchor line;

after said receiving and storing line $L_0$, selecting the plurality of code examples based on line $X_0$ in each selected code example matching line $L_0$ due to a method in line $X_0$ of each code example being of a same type and having a same signature as a method in line $L_0$;

after said selecting the plurality of code examples, ascertaining whether a custom line of code is inputted after said storing line $L_R$ is performed;

if said ascertaining ascertains that a custom line of code is inputted after said storing line $L_R$ is performed, then incrementing R by 1, followed by establishing line $L_R$ as a new custom line of code, and followed by storing line $L_R$;

if said ascertaining ascertains that a custom line of code is not inputted after said storing line $L_R$ is performed, then incrementing K by 1 and determining N=F(R) such that F(R) is a specified function of R, followed by identifying a set of assist lines ($X_K, X_{K+1}, \ldots, X_{NMIN}$) in each code example X such that NMIN is a minimum of N and the highest line number in each code example, followed by determining a set of preferred lines sequenced in an order of preference such that the preferred lines are selected from the set of assist lines in the code examples, followed by presenting to the user the set of preferred lines sequenced in the order of preference, followed by receiving a selected line selected by the user from the set of preferred lines and subsequently edited by the user, followed by incrementing R by 1, followed by establishing line $L_R$ to be the edited selected line, and followed by storing line $L_R$; and after storing line $L_R$, stopping the process if a stopping criterion is satisfied, otherwise looping back to said ascertaining.

The present invention provides a computer program product, comprising a computer readable storage medium having a computer readable program code stored therein, said computer readable program code containing instructions that when executed by a processor of a computer system implement a process for assisting a user to write an ordered sequence of new lines of code ($L_0, L_1, L_2, \ldots$) of a computer program, said process using a plurality of code examples such that each code example comprises an ordered sequence of lines of code ($X_0, X_1, X_2, \ldots$), said process utilizing an index R that points to line $L_R$ (R=0, 1, 2, ...) and initially points to the first line $L_0$ of the new lines of code, said process utilizing an index K that points to line $X_K$ (K=0, 1, 2, ...) and initially points to the first line $X_0$ of the ordered sequence of lines of code, said process comprising:

receiving and storing line $L_0$, wherein is an anchor line;

after said receiving and storing line $L_0$, selecting the plurality of code examples based on line $X_0$ in each selected code example matching line $L_0$ due to a method in line $X_0$ of each code example being of a same type and having a same signature as a method in line $L_0$;

after said selecting the plurality of code examples, ascertaining whether a custom line of code is inputted after said storing line $L_R$ is performed;

if said ascertaining ascertains that a custom line of code is inputted after said storing line $L_R$ is performed, then incrementing R by 1, followed by establishing line $L_R$ as a new custom line of code, and followed by storing line $L_R$;

if said ascertaining ascertains that a custom line of code is not inputted after said storing line $L_R$ is performed, then incrementing K by 1 and determining N=F(R) such that F(R) is a specified function of R, followed by identifying a set of assist lines ($X_K, X_{K+1}, \ldots, X_{NMIN}$) in each code example X such that NMIN is a minimum of N and the highest line number in each code example, followed by determining a set of preferred lines sequenced in an order of preference such that the preferred lines are selected from the set of assist lines in the code examples, followed by presenting to the user the set of preferred lines sequenced in the order of preference, followed by receiving a selected line selected by the user from the set of preferred lines and subsequently edited by the user, followed by incrementing R by 1, followed by establishing line $L_R$ to be the edited selected line, and followed by storing line $L_R$; and after storing line $L_R$, stopping the process if a stopping criterion is satisfied, otherwise looping back to said ascertaining.

The present invention provides a computer system comprising a processor and a computer readable memory unit coupled to the processor, said memory unit containing instructions that when executed by the processor implement a process for assisting a user to write an ordered sequence of new lines of code ($L_0, L_1, L_2, \ldots$) of a computer program, said process using a plurality of code examples such that each code example comprises an ordered sequence of lines of code ($X_0, X_1, X_2, \ldots$), said process utilizing an index R that points to line $L_R$ (R=0, 1, 2, ...) and initially points to the first line $L_0$ of the new lines of code, said process utilizing an index K that points to line $X_K$ (K=0, 1, 2, ...) and initially points to the first line $X_0$ of the ordered sequence of lines of code, said process comprising:

receiving and storing line $L_0$, wherein is an anchor line;

after said receiving and storing line $L_0$, selecting the plurality of code examples based on line $X_0$ in each selected code example matching line $L_0$ due to a method in line $X_0$ of each code example being of a same type and having a same signature as a method in line $L_0$;

after said selecting the plurality of code examples, ascertaining whether a custom line of code is inputted after said storing line $L_R$ is performed;

if said ascertaining ascertains that a custom line of code is inputted after said storing line $L_R$ is performed, then incrementing R by 1, followed by establishing line $L_R$ as a new custom line of code, and followed by storing line $L_R$;

if said ascertaining ascertains that a custom line of code is not inputted after said storing line $L_R$ is performed, then incrementing K by 1 and determining N=F(R) such that F(R) is a specified function of R, followed by identifying a set of assist lines $(X_K, X_{K+1}, \ldots, X_{NMIN})$ in each code example X such that NMIN is a minimum of N and the highest line number in each code example, followed by determining a set of preferred lines sequenced in an order of preference such that the preferred lines are selected from the set of assist lines in the code examples, followed by presenting to the user the set of preferred lines sequenced in the order of preference, followed by receiving a selected line selected by the user from the set of preferred lines and subsequently edited by the user, followed by incrementing R by 1, followed by establishing line $L_R$ to be the edited selected line, and followed by storing line $L_R$; and after storing line $L_R$, stopping the process if a stopping criterion is satisfied, otherwise looping back to said ascertaining.

The present invention provides an improved code assist that enables the user to write the computer program with less manual effort than is required with current code assist software.

DETAILED DESCRIPTION OF THE INVENTION

A statement of program code will be referred to as a "line of code" or a "line".

The code assist of the present invention creates dynamic, multi-line templates for call sequences of more than one line to complete a particular software action. When a code assist is activated, the system not only looks at what the user has typed and the definition of the target object/method, but also looks at other calls to the same method in available source code examples. Each code example comprises a plurality of lines of code.

The code completion is activated in two stages.

In the first stage, the user provides an initial line, called an anchor line, of the program portion to be assisted. The anchor line calls a method and this method serves as a foundation for developing subsequent lines of the program during the second stage.

In the second stage which occurs after the first stage, the system searches for lines calling the method in the anchor line or similar lines in the code examples in order to suggest additional subsequent lines from which the user may select for subsequent insertion into the program portion being written. Relationships and other characteristics of lines in the code examples provide criteria for generating and prioritizing the suggested additional subsequent lines.

In one embodiment, a line of code has the following form:
(r=} t.m(<a>);
wherein:
r is an optional assignment variable of type R;
t is an object variable of type T;
m is a method declared on type T;
<a> is a signature, namely the number and type of arguments comprising at least one variable and/or expression.

Although the examples presented herein conform to the preceding form for a line of code, the scope of the present invention includes other forms of lines of code that exist in various programming languages such as Java, C++, etc.

Consider any two lines, Line0 and Line1:
Line0: r0=t0.m0(<a0>).
Line1: r1=t1.m1(<a1>).

By definition, any two lines (Line0 and Line1) match if methods m0 and m1 are of a same type and have a same signature.

By definition, the two methods m0 and m1 are of the same type if m0 and m1 are defined on the same class. For example, if object variable t0 is of type T0 and object variable t1 is of type T1, and if the methods m0 and m1 are defined on a common super class of T0 and T1 (or common super interface if m0 and m1 are defined on common interface implemented by T0 and T1, respectively), and if the signatures <a0> and <a1> have a same signature, then Line0 and Line 1 match.

By definition, the two methods m0 and m1 have the same signature if m0 and m1 have the same number of arguments and if corresponding arguments in m0 and m1 are of a same type. For example, if the signature <a0> of method m0 is (int I0, boolean B0) and if the signature <a1> of method m1 is (int I1, boolean B1), then the signatures <a0> and <a1> each have 2 arguments such that the corresponding arguments in <a0> and <a1> are of the same type, namely int and boolean, respectively.

Figure 1:
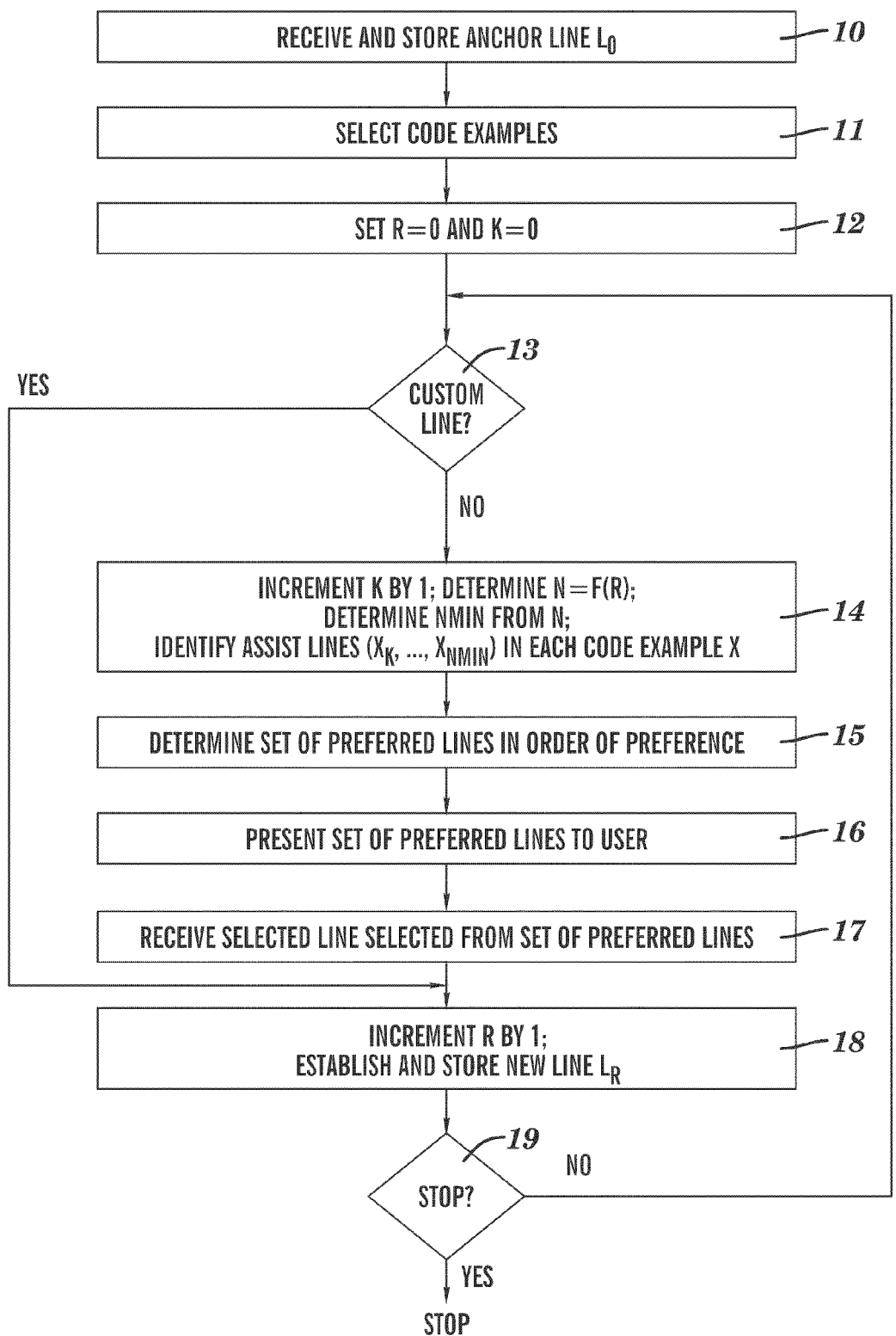
FIG. 1 is a flow chart describing a process for assisting a user to write an ordered sequence of new lines of code of a computer program, in accordance with embodiments of the present invention.

FIG. 1 is a flow chart describing a process for assisting a user to write an ordered sequence of new lines of code $(L_0, L_1, L_2, \ldots)$ of a computer program, in accordance with embodiments of the present invention. The initial new line of code $(L_0)$ is an anchor line that may be supplied by a user. The process uses a plurality of code examples such that each generic code example X comprises an ordered sequence of lines of code $(X_0, X_1, X_2, \ldots)$. The process is implemented by execution of instructions by a processor of a computer system (e.g., the computer system 90 described infra in conjunction with FIG. 2), said instructions being stored on computer readable storage media of the computer system. The process described in FIG. 1 comprises steps 10-19, which will be described infra using the following illustrative example to illustrate the steps of the process of FIG. 1.

$L_0$ TreeViewer tree=widgetFactory.createTreeViewer(container);

Code Example A $A_0$ TreeViewer selectionViewer=factory.createTreeViewer(parent);

$A_1$ selectionViewer.setLayoutData(new GridData(GridData.FILL_BOTH));

$A_2$ selectionViewer.setContentProvider(newAdapterFactoryContentProvider(adapterFactory));

$A_3$ selectionViewer.setLabelProvider(new AdapterFactory-LabelProvider(adapterFactory));
Code Example B
$B_0$ TreeViewer treeViewer=factory.createTreeViewer(parent);
$B_1$ parent.setLayoutData(gd);
$B_2$ parent.setLayout(fill);
$B_3$ treeViewer.setAutoExpandLevel(30);
$B_4$ treeViewer.setContentProvider(new ReverseAdapterFactoryContentProvider(adaptFactory));
$B_5$ treeViewer.setLabelProvider(new AdapterFactoryLabelProvider(adaptFactory));
Code Example C
$C_0$ TreeViewer treeViewer=factory.createTreeViewer(parent);
$C_1$ treeViewer.setLayoutData(new GridData(GridData.FILL_BOTH));
$C_2$ parent.setLayout(new GridLayout( ));
$C_3$ treeViewer.setAutoExpandLevel(30);
$C_4$ treeViewer.setContentProvider(new ReverseAdapterFactoryContentProvider(adaptFactory));
$C_5$ treeViewer.setLabelProvider(new AdapterFactoryLabelProvider(adaptFactory));

The preceding illustrative example uses 3 code examples: A, B, and C. Therefore, in Example A the generic code example $X_0, X_1, X_2, \ldots$ is instantiated as $A_0, A_1, A_2, A_3$, in Example B the generic code example $X_0, X_1, X_2, \ldots$ is instantiated as $B_0, B_1, B_2, B_3, B_4, B_5$, and in Example C the generic code example $X_0, X_1, X_2, \ldots$ is instantiated as $C_0, C_1, C_2, C_3, C_4, C_5$.

In FIG. 1, step 10 receives the anchor line $L_0$ from the user (e.g., by user entry such as by typing the anchor line, selecting the anchor line from a menu, etc.). Alternatively, the anchor line $L_0$ may be extracted from the storage media of the computer system (e.g., from a file). The received anchor line $L_0$ is subsequently stored in the storage media of the computer system.

Step 11 selects the plurality of code examples based on the initial line $X_0$ in each selected code example matching the anchor line $L_0$. By definition, said matching requires a method in the initial line $X_0$ of each code example X to be of a same type and have a same signature as a method in the anchor line $L_0$. In code examples A, B, and C, the respective initial line $A_0$, $B_0$, and $C_0$ contain method calls on variables named "factory", all said variables assumed to be of the same type (say Factory) and each method has a signature of "parent" (assumed to all be of type Container). The anchor line $L_0$ contains a method call on a variable named "widgetFactory" (assumed to be of type Factory) and has a signature of "container" (assumed to be of type Container). Therefore, it is assumed for this illustrative example that the type "factory" and "widgetFactory" are a same type, and type "parent" and "container" are a same type. Therefore, lines $A_0$, $B_0$, and $C_0$ each match the anchor line $L_0$.

Step 12 sets an index R to 0 and an index K to 0. Lines 13-19 define a loop and the index R is an iteration index for the loop starting with R=0 for the first iteration of the loop. The index R also indexes the new lines ($L_R$) generated for the computer program being written by the user, since a new line for the computer program is established and stored in step 18 for each iteration of the loop. The loop splits at step 13 into a code assist branch and a custom line branch. The code assist branch generates a new line for the computer program via code assist (steps 14-17 executed). The custom line branch generates a new line for the computer program via a custom line of code provided by the user (steps 14-17 bypassed).

Both branches merge into step 18 at which the new line ($L_R$) for the computer program is established and stored.

The index K is a code assist counter which is incremented in step 14 each time the code assist branch (steps 14-17) of the loop is executed.

Step 13 ascertains (e.g., by querying the user) whether a custom line of code is being inputted in the current iteration R since the last new line ($L_R$) was established and stored. The user may input a custom line during any iteration of the loop. Each such custom line of code becomes a next new line of code ($L_R$) for the computer program being written by the user.

If step 13 ascertains that a custom line of code is being inputted, then step 18 is next performed and the code assist sequence (steps 14-17) is not executed for the current iteration R.

If step 13 ascertains that a custom line of code has not been inputted in the current iteration (i.e., after storing line $L_R$ was performed for the current value of R), then code assist steps 14-17 are next performed, followed by execution of step 18.

Step 14 increments K by 1, determines N from N=F(R) via specified function F(R), determines NMIN as a minimum of N and the highest line number in each code example, and identifies a set of assist lines $X_K, \ldots, X_{NMIN}$ in each code example X. In the illustrative example, K=1 in the current iteration of R=0.

The function F(R) may be expressed in the form of an analytical function of R such as F(R)=ceiling(1.5*R+1) wherein the function ceiling(Z) returns the smallest integer not less than Z. Alternatively, the function F(R) may be expressed as a table of N versus R For the illustrative example, it is assumed that N=1 at R=0, which is the value of N obtained using N=ceiling(1.5*R+1). Furthermore, NMIN=N=1 at the current iteration of R=0, since the minimum of N (i.e., 1) and the highest line number in each code example is 1. In one embodiment, N exceeds R+1 to allow for introduction of custom lines of code by the user. Table 1 illustrates the function ceiling(1.5*R+1).

TABLE 1

| Lines Completed | R | N = ceiling(1.5 * R + 1) |
| --- | --- | --- |
| $L_0$ | 0 | 1 |
| $L_0, L_1$ | 1 | 3 |
| $L_0, L_1, L_2$ | 2 | 4 |
| $L_0, L_1, L_2, L_3$ | 3 | 6 |
| $L_0, L_1, L_2, L_3, L_4$ | 4 | 7 |

Thus for the illustrated example, K=1 and R=0 so that the set of assist lines for this iteration (R=0) is $A_1$, $B_1$, and $C_1$ for code example A, B, and C, respectively.

Step 15 determines a set of preferred lines sequenced in an order of preference such that one of the preferred lines will be subsequently selected by the user from the set of assist lines in the code examples. In one embodiment, the set of preferred lines consists of all lines of the set of assist lines in the code examples. In one embodiment, the set of preferred lines consists of fewer than all lines of the set of assist lines in the code examples. Various criteria could be selectively employed to sequence the preferred lines in order of preference.

One criteria for determining a set of preferred lines sequenced in order of preference is "matched line grouping" which is defined as grouping lines such that the lines within each group match each other, and the groups are ranked in descending order of the number of lines in each group. For example, if two groups G1 and G2 are formed such that group G1 consists of 3 lines matching each other and group G2 consists of 5 lines matching each other, then the 5 lines in group G2 are ranked higher than the 3 lines in group G1, because 5 is greater than 3.

For the illustrative example, the set of preferred lines are selected from the set of assist lines of $A_1$, $B_1$, and $C_1$ for code examples A, B, and C, respectively in the current iteration of R=0. The lines $A_1$, $B_1$, and $C_1$ match each other because they each call the same method "setLayoutData" of the same type and have the same signature ("new GridData(GridData.FILL_BOTH)" and "gd" are assumed to be of the same type). Thus with only one such group, there is no preferential ranking or ordering of lines $A_1$, $B_1$, and $C_1$. Therefore, the set of preferred lines could sequence $A_1$, $B_1$, and $C_1$ in any order.

One criteria for determining a set of preferred lines sequenced in order of preference is "positional equivalence grouping" which is defined as grouping lines such that the lines within each group comprise an object variable that appears in a same relative position in a respective preceding line, and the groups are ranked in descending order of the number of lines in each group. For example, if two groups G1 and G2 are formed such that group G1 consists of 3 lines positionally equivalent to each other and group G2 consists of 5 lines positionally equivalent to each other, then the 5 lines in group G2 are ranked higher than the 3 lines in group G1, because 5 is greater than 3.

For the illustrative example, lines $A_1$ and $C_1$ are better choices than line $B_1$ to present hierarchically to the user, because lines $A_1$ and $C_1$ are positionally equivalent with respect to their previous lines $A_0$ and $C_0$, respectively, and line $B_1$ is not positionally equivalent to line $A_1$ and/or $C_1$. In particular, lines $A_1$ and $C_1$ are positionally equivalent with respect to their respective previous lines $A_0$ and $C_0$, because the same method (setLayoutData) in lines $A_1$ and $C_1$ is called on an object variable "selectionViewer" and "treeViewer", respectively, such that "selectionViewer" and "treeViewer" appear in equivalent positions within lines $A_0$ and $C_0$, respectively. In contrast in line $B_1$, the method (setLayoutData) is called on object variable "parent" which appears in a different position in its previous line $B_0$ than the position of object variable "selectionViewer" and "treeViewer" of lines $A_1$ and $C_1$ in their previous lines $A_0$ and $C_0$, respectively. Therefore, lines $A_1$ and $C_1$ are ranked higher than line $B_1$. Thus, the set of preferred lines could be sequenced as $A_1$, $C_1$, $B_1$ or as $C_1$, $A_1$, $B_1$. Alternatively, line B1 could be omitted such that the set of preferred lines is sequenced as $A_1$, $C_1$ or as $C_1$, $A_1$.

One criteria for determining a set of preferred lines sequenced in order of preference is "matched variable grouping" which is defined as a grouping two lines characterized by a percentage of matches of positionally corresponding variables in the two lines, and the groups are ranked in descending order of said percentage. For example, if two groups G1 and G2 are formed such that two lines in group G1 have a percentage of 75% of matches of positionally corresponding variables and two lines in group G2 have a percentage of 60% of matches of positionally corresponding variables, then the 2 lines in group G1 are ranked higher than the 2 lines in group G2, because 75% is greater than 60%.

For the illustrative example, the set of preferred lines are selected from the set of assist lines of $A_1$, $B_1$, and $C_1$ for code examples A, B, and C, respectively. The lines $A_1$ and $B_1$ have a percentage of 0% of matches of positionally corresponding variables. The lines $C_1$ and $B_1$ have a percentage of 0% of matches of positionally corresponding variables. The lines $A_1$ and $C_1$ have a percentage of 100% of matches of positionally corresponding variables (i.e., variable "GridData(GridData.FILL_BOTH)". See lines $A_1$ and $C_1$ below.

$A_1$  selectionViewer.setLayoutData(new GridData(GridData.FILL_BOTH));
$C_1$  treeViewer.setLayoutData(new GridData(GridData.FILL_BOTH));

Therefore, the set of preferred lines could be sequenced as $A_1$, $C_1$, $B_1$ or as $C_1$, $A_1$ $B_1$. Alternatively, line B1 could be omitted such that the set of preferred lines is sequenced as $A_1$, $C_1$ or as $C_1$, $A_1$.

An example of the calculation of percentage of matches of positionally corresponding variables is illustrated in the following comparison of lines U1 and V1.

U1  Object gd1=tree1.setLayoutData (1,container1,new GridData(gd1, "A"));
V1  Object gd1=container1.setLayoutData(2,container1, new GridData(gd1,null););

There are 3 matched variable comparisons: "gd1" (appearing to the left of "="), "container", and "gd1" (appearing to the right of "="). There is 1 unmatched variable comparison: "tree1" in line U1 versus "container1" in line V1. Therefore, the percentage of matches in the group of U1 and V1 is 75% (i.e., ¾).

Step 16 presents to the user the set of preferred lines sequenced in the order of preference.

Step 17 receives an edited selected line that was selected by the user from the set of preferred lines. The user had selected a preferred line from the presented set of preferred lines. For the illustrative example, assume that the set of preferred lines sequenced in the order of preference consists of $A_1$, $C_1$, and $B_1$ such that lines $A_1$ and $C_1$ are preferentially equivalent to each other and both are preferred over line $B_1$. Then the selected preferred line selected by the user may be line $C_1$. The selected preferred line ($C_1$) is then edited by the user to fit the user's context (i.e., to be compatible with the semantics and syntax of the computer program being written by the user).

Step 18 increments R by 1, establishes the new line $L_R$, and stores line $L_R$ in the storage media. If the current iteration is processing a custom line of code, then the new line $L_R$ is the custom line of code. If the current iteration is not processing a custom line of code but has instead executed code assist steps 14-17, then the new line $L_R$ is the edited selected line received in step 17. In the illustrated example, the selected line ($C_1$) and a possible new line $L_1$ are:

$C_1$  treeViewer.setLayoutData(new GridData(GridData.FILL_BOTH));
$L_1$  tree.setLayoutData(new GridData(GridData.FILL_BOTH));

Step 18 increments R to 1 and stores the new line $L_1$.

Step 19 stops the process of FIG. 1 if a stopping criterion is satisfied, otherwise the process loops back to step 13 to perform the next iteration R. The stopping criteria may comprise detection of a directive by the user to stop the process such as detecting that a special key (e.g., the escape key) or detecting the directive as a response by the user to being queried as to whether the user desires to stop the process. Another stopping criteria is when R+1 exceeds a specified threshold value (e.g., 10, 20, etc.).

In the illustrated example, it is assumed that the process does not stop at step 19 after line $L_1$ has been stored in step 18. Thus the process loops back to step 13 to execute the next iteration characterized by R=1. It is assumed that a custom line of code has been inputted for the R=1 iteration, so that the process bypasses steps 14-17 and branches directly to step 18 at which R is incremented to R=2 and the new line $L_2$ (from custom line of code) is stored.

In the illustrated example, it is assumed that the process does not stop at step 19 after line $L_2$ has been stored in step 18.

Thus the process loops back to step 13 to execute the next iteration characterized by R=2. It is assumed that a custom line of code has not been inputted for the R=2 iteration, so that the process executes the code assist branch of steps 14-17 to determine the next new line ($L_3$).

Step 14 increments K by 1 to K=2, determines N from N=F(R), determines NMIN, and identifies a set of assist lines $X_K, \ldots, X_{MIN}$ in each code example X.

In the illustrative example, K=2 in the current iteration of R=2. Using F(R)=ceiling(1.5*R+1), it is determined that N=4. The maximum line number of code examples A, B, and C is 3, 5, and 5, respectively Therefore since each NMIN is the minimum of N and the highest line number of the corresponding code example, NMIN is 3, 4, and 4 for code examples A, B, and C, respectively. Thus, the set of assist lines are: lines $A_2, A_3$ from Example A, lines $B_2, B_3, B_4$ from Example B, and lines $C_2, C_3, C_4$ from Example C. More explicitly, the set of assist lines are:

$A_2$ selectionViewer.setContentProvider(new AdapterFactoiyContentProvider(adapterFactory));
$A_3$ selectionViewer.setLabelProvider(new AdapterFactoryLabelProvider(adapterFactory));
$B_2$ parent.setLayout(fill);
$B_3$ treeViewer.setAutoExpandLevel(30);
$B_4$ treeViewer.setContentProvider(new ReverseAdapterFactoryContentProvider(adaptFactory));
$C_2$ parent.setLayout(new GridLayout( ));
$C_3$ treeViewer.setAutoExpandLevel(30);
$C_4$ treeViewer.setContentProvider(new ReverseAdapterFactoryContentProvider(adaptFactory));

In step 15, any of the previously discussed criteria ("matched line grouping", "positional equivalence grouping", "matched variable grouping") could be used to determine, from the set of assist lines, a set of preferred lines sequenced in an order of preference.

Another criteria for determining a set of preferred lines sequenced in order of preference is "line order grouping" which is defined as grouping of lines in which the set of first lines in the code examples form a first preferred group of lines, the set of second lines in the code examples form a second preferred group of lines, etc. For the illustrative example in one embodiment, the set of preferred lines are: the first preferred group of lines of ($A_2, B_2, C_2$). In one embodiment, the set of preferred lines are: the first preferred group of lines of ($A_2, B_2, C_2$), followed by the second preferred group of lines of ($A_3, B_3, C_3$). In one embodiment the set of preferred lines are: a first preferred group of lines of ($A_2, B_2, C_2$), followed by a second preferred group of lines of ($A_3, B_3, C_3$), and followed by a third preferred group of lines of ($B_4, C_4$).

Another criteria for determining a set of preferred lines sequenced in order of preference is "method popularity grouping" which is defined as grouping of lines in which a method appears in more code examples than does any other method. This method is called a most popular method. For the illustrative example, the most popular method is setContentProvider which appears in all of the code examples (A, B, C). The second most popular method is setLayout (which appear in code examples A and C but not code example B) or setAutoExpandLevel (which appear in code examples B and C but not code example A). In one embodiment, the set of preferred lines consist of the lines in which the method setContentProvider appears ($A_2, B_4, C_4$). In one embodiment, the set of preferred lines consist of the lines in which the method setContentProvider appears ($A_2, B_4, C_4$), followed by the lines in which the method setAutoExpandLevel appears ($B_3, C_3$), followed by the lines in which the method setLayout appears ($B_2, C_2$). In one embodiment, the set of preferred lines consist of the lines in which the method setContentProvider appears ($A_2, B_4, C_4$), followed by the lines in which the method setLayout appears ($B_2, C_2$), followed by the lines in which the method setAutoExpandLevel appears ($B_3, C_3$).

Step 16 presents to the user the set of preferred lines in the order of preference Step 17 receives an edited selected line that was selected by the user from the set of preferred lines.

Step 18 increments R to 3 and stores the new line $L_3$.

In the illustrated example, it is assumed that the process does not stop at step 19 after line $L_3$ has been stored in step 18. Thus the process loops back to step 13 to execute the next iteration characterized by R=3. It is assumed that a custom line of code has not been inputted for the R=3 iteration, so that the process executes the code assist branch of steps 14-17 to determine the next new line ($L_4$).

Step 14 increments K by 1 to K=3, determines N from N=F(R), determines NMIN, and identifies a set of assist lines $X_K, \ldots, X_{MIN}$ in each code example X.

In the illustrative example, K=3 in the current iteration of R=3. Using F(R)=ceiling(1.5*R+1), it is determined that N=6. The maximum line number of code examples A, B, and C is 3, 5, and 5, respectively Therefore since each NMIN is the minimum of N and the maximum line number of the corresponding code example, NMIN is 3, 5, and 5 for code examples A, B, and C respectively. Thus, the set of assist lines are: lines $A_3$ from Example A, lines $B_3, B_4, B_5$ from Example B, and lines $C_3, C_4, C_5$ from Example C.

Steps 15-17 are executed as in preceding iterations.

Step 18 increments R to 4 and stores the new line $L_4$.

Step 19 either stops the process of loops back to step 13 to perform the next iteration for R=4. At the current iteration or at a subsequent iteration, the process will stop at step 19.

Figure 2:
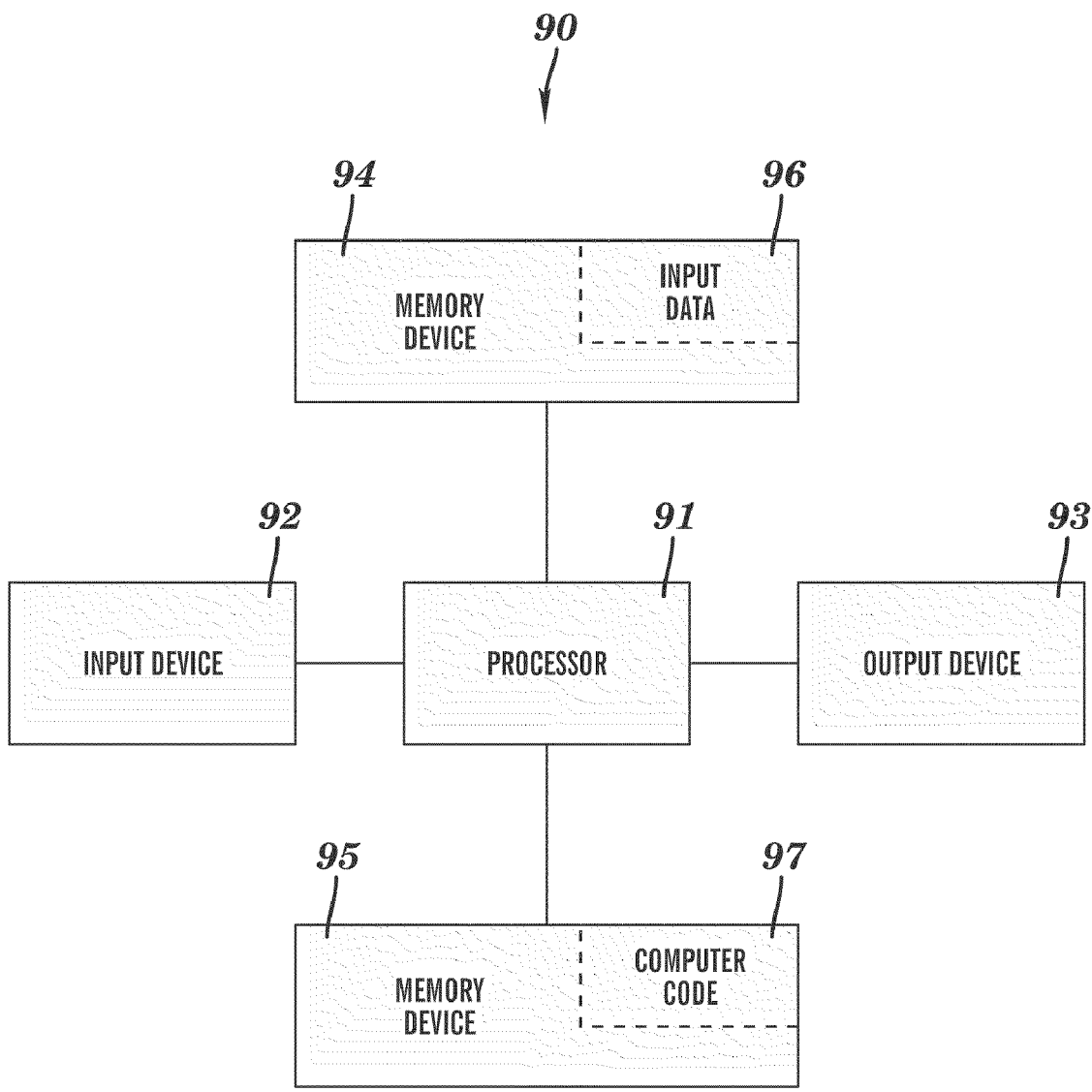
FIG. 2 illustrates a computer system used for assisting a user to write an ordered sequence of new lines of code of a computer program, in accordance with embodiments of the present invention.

FIG. 2 illustrates a computer system 90 used for assisting a user to write an ordered sequence of new lines of code of a computer program, in accordance with embodiments of the present invention. The computer system 90 comprises a processor 91, an input device 92 coupled to the processor 91, an output device 93 coupled to the processor 91, and memory devices 94 and 95 each coupled to the processor 91. The processor 91 is a processing unit such as a central processing unit (CPU). The input device 92 may be, inter alia, a keyboard, a mouse, etc. The output device 93 may be, inter alia, a printer, a plotter, a display device (e.g., a computer screen), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for assisting a user to write an ordered sequence of new lines of code of a computer program. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 2) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 2 shows the computer system 90 as a particular configuration of hardware and software, any configuration of hardware and software, as would be known to a person of ordinary skill in the art, may be utilized for the purposes stated supra in conjunction with the particular computer system 90 of FIG. 2. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A process for assisting a user to write an ordered sequence of new lines of code ($L_0, L_1, L_2, \ldots$) of a computer program, said process using a plurality of code examples such that each code example comprises an ordered sequence of lines of code ($X_0, X_1, X_2, \ldots$), said process implemented by execution of instructions by a processor of a computer system, said instructions being stored on computer readable storage media of the computer system, said process utilizing an index R that points to line $L_R$ (R=0, 1, 2, . . . ) and initially points to the first line $L_0$ of the new lines of code, said process utilizing an index K that points to line $X_K$ (K=0, 1, 2, . . . ) and initially points to the first line $X_0$ of the ordered sequence of lines of code, said process comprising:

receiving and storing line $L_0$;

after said receiving and storing line $L_0$, selecting the plurality of code examples based on line $X_0$ in each selected code example matching line $L_0$ due to a method in line $X_0$ of each code example being of a same type and having a same signature as a method in line $L_0$;

after said selecting the plurality of code examples, ascertaining whether a custom line of code is inputted after said storing line $L_R$ is performed;

if said ascertaining ascertains that a custom line of code is inputted after said storing line $L_R$ is performed, then incrementing R by 1, followed by establishing line $L_R$ as a new custom line of code, and followed by storing line $L_R$;

if said ascertaining ascertains that a custom line of code is not inputted after said storing line $L_R$ is performed, then incrementing K by 1 and determining N=F(R) such that F(R) is a specified function of R, followed by identifying a set of assist lines ($X_K, X_{K+1}, \ldots, X_{NMIN}$) in each code example X such that NMIN is a minimum of N and the highest line number in each code example, followed by determining a set of preferred lines sequenced in an order of preference such that the preferred lines are selected from the set of assist lines in the code examples, followed by presenting to the user the set of preferred lines sequenced in the order of preference, followed by receiving a selected line selected by the user from the set of preferred lines and subsequently edited by the user, followed by incrementing R by 1, followed by establishing line $L_R$ to be the edited selected line, and followed by storing line $L_R$; and after storing line $L_R$, stopping the process if a stopping criterion is satisfied, otherwise looping back to said ascertaining.

2. The process of claim 1, wherein at R=R1 said ascertaining ascertains that a custom line of code is inputted, said R1 being an integer of at least 1.

3. The process of claim 1, wherein at R=R1 said ascertaining ascertains that a custom line of code is not inputted, said R1 being an integer of at least 1.

4. The process of claim 3, wherein at R=R1 said determining a set of preferred lines sequenced in an order of preference is performed in accordance with matched line grouping.

5. The process of claim 3, wherein at R=R1 said determining a set of preferred lines sequenced in an order of preference is performed in accordance with positional equivalence grouping.

6. The process of claim 3, wherein at R=R1 said determining a set of preferred lines sequenced in an order of preference is performed in accordance with matched variable grouping.

7. The process of claim 3, wherein at R=R1 said determining a set of preferred lines sequenced in an order of preference is performed in accordance with line order grouping.

8. The process of claim 3, wherein F(R)=ceiling(1.5*R+1), and wherein the ceiling(1.5*R+1) returns the smallest integer not less than (1.5*R+1).

9. A computer program product, comprising a computer readable storage device having a computer readable program code stored therein, said computer readable program code containing instructions that when executed by a processor of a computer system implement a process for assisting a user to write an ordered sequence of new lines of code ($L_0, L_1, L_2, \ldots$) of a computer program, said process using a plurality of code examples such that each code example comprises an ordered sequence of lines of code ($X_0, X_1, X_2, \ldots$), said process utilizing an index R that points to line $L_R$ (R=0, 1, 2, . . . ) and initially points to the first line $L_0$ of the new lines of code, said process utilizing an index K that points to line $X_K$ (K=0, 1, 2, . . . ) and initially points to the first line $X_0$ of the ordered sequence of lines of code, said process comprising:

receiving and storing line $L_0$;

after said receiving and storing line $L_0$, selecting the plurality of code examples based on line $X_0$ in each selected code example matching line $L_0$ due to a method in line $X_0$ of each code example being of a same type and having a same signature as a method in line $L_0$;

after said selecting the plurality of code examples, ascertaining whether a custom line of code is inputted after said storing line $L_R$ is performed;

if said ascertaining ascertains that a custom line of code is inputted after said storing line $L_R$ is performed, then incrementing R by 1, followed by establishing line $L_R$ as a new custom line of code, and followed by storing line $L_R$;

if said ascertaining ascertains that a custom line of code is not inputted after said storing line $L_R$ is performed, then incrementing K by 1 and determining N=F(R) such that F(R) is a specified function of R, followed by identifying a set of assist lines ($X_K, X_{K+1}, \ldots, X_{NMIN}$) in each code example X such that NMIN is a minimum of N and the highest line number in each code example, followed by determining a set of preferred lines sequenced in an order of preference such that the preferred lines are selected from the set of assist lines in the code examples, followed by presenting to the user the set of preferred lines sequenced in the order of preference, followed by receiving a selected line selected by the user from the set of preferred lines and subsequently edited by the user, followed by incrementing R by 1, followed by establishing line $L_R$ to be the edited selected line, and followed by storing line $L_R$; and after storing line $L_R$, stopping the process if a stopping criterion is satisfied, otherwise looping back to said ascertaining.

10. The computer program product of claim 9, wherein at R=R1 said ascertaining ascertains that a custom line of code is inputted, said R1 being an integer of at least 1.

11. The computer program product of claim 9, wherein at R=R1 said ascertaining ascertains that a custom line of code is not inputted, said R1 being an integer of at least 1.

12. The computer program product of claim 11, wherein at R=R1 said determining a set of preferred lines sequenced in an order of preference is performed in accordance with matched line grouping.

13. The computer program product of claim 11, wherein at R=R1 said determining a set of preferred lines sequenced in an order of preference is performed in accordance with positional equivalence grouping.

14. The computer program product of claim 11, wherein at R=R1 said determining a set of preferred lines sequenced in an order of preference is performed in accordance with matched variable grouping.

15. The computer program product of claim 11, wherein at R=R1 said determining a set of preferred lines sequenced in an order of preference is performed in accordance with line order grouping.

16. The computer program product of claim 11, wherein at R=R1 said determining a set of preferred lines sequenced in an order of preference is performed in accordance with method popularity grouping.

17. A computer system comprising a processor and a computer readable memory unit coupled to the processor, said memory unit containing instructions that when executed by the processor implement a process for assisting a user to write an ordered sequence of new lines of code ($L_0, L_1, L_2, \ldots$) of a computer program, said process using a plurality of code examples such that each code example comprises an ordered sequence of lines of code ($X_0, X_1, X_2, \ldots$), said process utilizing an index R that points to line $L_R$ (R=0, 1, 2, ...) and initially points to the first line $L_0$ of the new lines of code, said process utilizing an index K that points to line $X_K$ (K=0, 1, 2, ...) and initially points to the first line $X_0$ of the ordered sequence of lines of code, said process comprising:

receiving and storing line $L_0$;

after said receiving and storing line $L_0$, selecting the plurality of code examples based on line $X_0$ in each selected code example matching line $L_0$ due to a method in line $X_0$ of each code example being of a same type and having a same signature as a method in line $L_0$;

after said selecting the plurality of code examples, ascertaining whether a custom line of code is inputted after said storing line $L_R$ is performed;

if said ascertaining ascertains that a custom line of code is inputted after said storing line $L_R$ is performed, then incrementing R by 1, followed by establishing line $L_R$ as a new custom line of code, and followed by storing line $L_R$;

if said ascertaining ascertains that a custom line of code is not inputted after said storing line $L_R$ is performed, then incrementing K by 1 and determining N=F(R) such that F(R) is a specified function of R, followed by identifying a set of assist lines ($X_K, X_{K+1}, \ldots, X_{NMIN}$) in each code example X such that NMIN is a minimum of N and the highest line number in each code example, followed by determining a set of preferred lines sequenced in an order of preference such that the preferred lines are selected from the set of assist lines in the code examples, followed by presenting to the user the set of preferred lines sequenced in the order of preference, followed by receiving a selected line selected by the user from the set of preferred lines and subsequently edited by the user, followed by incrementing R by 1, followed by establishing line $L_R$ to be the edited selected line, and followed by storing line $L_R$; and after storing line $L_R$, stopping the process if a stopping criterion is satisfied, otherwise looping back to said ascertaining.

18. The computer system of claim 17, wherein at R=R1 said ascertaining ascertains that a custom line of code is inputted, said R1 being an integer of at least 1.

19. The computer system of claim 17, wherein at R=R1 said ascertaining ascertains that a custom line of code is not inputted, said R1 being an integer of at least 1.

20. The computer system of claim 19, wherein at R=R1 said determining a set of preferred lines sequenced in an order of preference is performed in accordance with matched line grouping.

21. The computer system of claim 19, wherein at R=R1 said determining a set of preferred lines sequenced in an order of preference is performed in accordance with positional equivalence grouping.

22. The computer system of claim 19, wherein at R=R1 said determining a set of preferred lines sequenced in an order of preference is performed in accordance with matched variable grouping.

23. The computer system of claim 19, wherein at R=R1 said determining a set of preferred lines sequenced in an order of preference is performed in accordance with line order grouping.

24. The computer system of claim 19, wherein at R=R1 said determining a set of preferred lines sequenced in an order of preference is performed in accordance with method popularity grouping.

* * * * *